US006995102B2

(12) United States Patent
Jones et al.

(10) Patent No.: US 6,995,102 B2
(45) Date of Patent: Feb. 7, 2006

(54) INFRARED ABSORBING BLUE GLASS COMPOSITION

(75) Inventors: James V. Jones, Nashville, TN (US); Edward N. Boulos, Troy, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 193 days.

(21) Appl. No.: 10/620,887

(22) Filed: Jul. 16, 2003

(65) Prior Publication Data

US 2005/0014627 A1 Jan. 20, 2005

(51) Int. Cl.
C03C 3/087 (2006.01)
C03C 4/10 (2006.01)
C03C 4/08 (2006.01)

(52) U.S. Cl. .................... 501/70; 501/71; 501/904; 501/905

(58) Field of Classification Search ................ 501/70, 501/71, 904, 905
See application file for complete search history.

(56) References Cited

U.S. PATENT DOCUMENTS

| | | | |
|---|---|---|---|
| 1,961,603 A | 6/1934 | Berger | |
| 2,505,001 A | 4/1950 | Nordberg | |
| 3,343,935 A | 9/1967 | Keefer et al. | |
| 3,345,190 A | 10/1967 | Albinak | |
| 3,486,874 A | 12/1969 | Rough | |
| 3,498,806 A | 3/1970 | Hammer et al. | |
| 3,578,430 A | 5/1971 | Labrot | |
| 3,652,303 A | 3/1972 | Rao | |
| 3,779,733 A | 12/1973 | Janakirama-Rao | |
| 3,951,635 A | 4/1976 | Rough, Sr. | |
| 3,971,646 A | 7/1976 | Rhodes | |
| 4,104,076 A | 8/1978 | Pons | |
| 4,381,934 A | 5/1983 | Kunkle et al. | |
| 4,493,557 A | 1/1985 | Nayak et al. | |
| 4,519,814 A | 5/1985 | Demarest, Jr. | |
| 4,529,428 A | 7/1985 | Groetzinger | |
| 4,539,034 A | 9/1985 | Hanneken | |
| 4,610,711 A | 9/1986 | Matesa et al. | |
| 4,701,425 A | 10/1987 | Baker et al. | |
| 4,738,938 A | 4/1988 | Kunkle et al. | |
| 4,792,536 A | 12/1988 | Pecoraro et al. | |
| 4,866,010 A | 9/1989 | Boulos et al. | |
| 5,013,487 A | 5/1991 | Cheng | |
| 5,077,133 A | 12/1991 | Cheng | |
| 5,112,778 A | 5/1992 | Cheng et al. | |
| 5,214,008 A | 5/1993 | Beckwith et al. | |
| 5,240,886 A | 8/1993 | Gulotta et al. | |
| 5,308,805 A | 5/1994 | Baker et al. | |
| RE34,639 E | 6/1994 | Boulos et al. | |
| 5,318,931 A | 6/1994 | Nakaguchi et al. | |
| 5,320,986 A | 6/1994 | Taniguchi et al. | |
| 5,344,798 A | 9/1994 | Morimoto et al. | |
| 5,346,867 A | 9/1994 | Jones et al. | |
| RE34,760 E | 10/1994 | Boulos et al. | |
| 5,352,640 A | 10/1994 | Combes et al. | |
| 5,362,689 A | 11/1994 | Morimoto et al. | |
| 5,385,872 A | 1/1995 | Gulotta et al. | |
| 5,393,593 A | 2/1995 | Gulotta et al. | |
| 5,411,922 A | 5/1995 | Jones | |
| 5,478,783 A | 12/1995 | Higby et al. | |
| 5,521,128 A | 5/1996 | Jones et al. | |
| 5,523,263 A | 6/1996 | Penrod | |
| 5,558,942 A | 9/1996 | Itoh et al. | |
| 5,582,455 A | 12/1996 | Casariego et al. | |
| 5,593,929 A | 1/1997 | Krumwiede et al. | |
| 5,610,107 A | 3/1997 | Danielson et al. | |
| 5,641,716 A | 6/1997 | Higby et al. | |
| 5,688,727 A | 11/1997 | Shelestak et al. | |
| 5,700,579 A | 12/1997 | Jeanvoine et al. | |
| 5,723,390 A | 3/1998 | Kijima et al. | |
| 5,725,628 A * | 3/1998 | Boulos et al. | ............. 65/134.1 |
| 5,726,109 A | 3/1998 | Ito et al. | |
| 5,747,398 A | 5/1998 | Higby et al. | |
| 5,776,845 A | 7/1998 | Boulos et al. | |
| 5,776,846 A | 7/1998 | Sakaguchi et al. | |
| 5,780,372 A | 7/1998 | Higby | |

(Continued)

FOREIGN PATENT DOCUMENTS

EP          0490494 A2     6/1992

(Continued)

OTHER PUBLICATIONS

Glass Science and Technology, 2—Colour Generation and Control in Glass, by C.R. Bamford Elsevier Scientific Publishing Company Amsterdam-Oxford-New York 1977; pp. 35, 36, 78, 79, 106, 107, 108, 109, 142, 143, 144, 145, 146, No date available.

(Continued)

Primary Examiner—Karl Group
Assistant Examiner—Elizabeth A. Bolden
(74) Attorney, Agent, or Firm—Brinks Hofer Gilson & Lione

(57) ABSTRACT

A blue glass composition comprises a soda-lime-silica base and a colorant portion consisting essentially of about 0.4 to 0.65 weight percent total iron oxide, about 0.1 to 0.3 weight percent manganese oxide, and cobalt oxide in an amount effective to produce a cobalt concentration of about 0.0002 to 0.0013 weight percent (about 2 to 13 ppm). The glass is characterized by a ratio of ferrous oxide to total iron oxide between about 0.43 and 0.58. The glass composition exhibits a combination of high visible transmittance, high infrared absorption and enhanced blue coloration. This is attributed in large part to the combination of ferrous oxide and cobalt oxide and to the effect of manganese oxide in reducing iron sulfide formation and thereby avoiding amber coloration.

10 Claims, No Drawings

U.S. PATENT DOCUMENTS

| | | |
|---|---|---|
| 5,807,417 A | 9/1998 | Boulos et al. |
| 5,830,812 A | 11/1998 | Shelestak et al. |
| 5,830,814 A | 11/1998 | Combes |
| 5,851,940 A | 12/1998 | Boulos et al. |
| 5,858,894 A | 1/1999 | Nagashima et al. |
| 5,877,102 A | 3/1999 | DuPont et al. |
| 5,877,103 A | 3/1999 | Dupont et al. |
| 5,888,917 A | 3/1999 | Kawaguchi et al. |
| 5,897,956 A | 4/1999 | Kijima et al. |
| 5,908,794 A | 6/1999 | Maeda et al. |
| 5,932,502 A | 8/1999 | Longobardo et al. |
| 5,952,255 A | 9/1999 | Seto et al. |
| 5,977,002 A | 11/1999 | Boulos et al. |
| 5,985,780 A | 11/1999 | Alvarez Casariego et al. |
| 6,017,837 A | 1/2000 | Nagashima et al. |
| 6,046,122 A | 4/2000 | Nagashima et al. |
| 6,071,840 A | 6/2000 | Sasage et al. |
| 6,103,650 A | 8/2000 | Krumwiede |
| 6,150,028 A | 11/2000 | Mazon |
| 6,218,323 B1 | 4/2001 | Bretschneider et al. |
| RE37,328 E | 8/2001 | Pecoraro et al. |
| 6,313,052 B1 | 11/2001 | Nakashima et al. |
| 6,313,053 B1 | 11/2001 | Shelestak |
| 6,408,650 B1 | 6/2002 | Boulos et al. |
| 6,548,434 B2 | 4/2003 | Nagashima |
| 6,596,660 B1 | 7/2003 | Boulos et al. |
| 2001/0018393 A1 | 8/2001 | Nagashima et al. |
| 2001/0021685 A1 | 9/2001 | Sakaguchi et al. |
| 2001/0034295 A1 | 10/2001 | Seto et al. |
| 2002/0025899 A1 | 2/2002 | Higby et al. |
| 2002/0058579 A1 | 5/2002 | Seto et al. |
| 2002/0068678 A1 | 6/2002 | Seto et al. |
| 2002/0155939 A1 | 10/2002 | Seto et al. |
| 2002/0169064 A1 | 11/2002 | Nagashima |
| 2002/0198094 A1 | 12/2002 | Arbab et al. |

FOREIGN PATENT DOCUMENTS

| | | |
|---|---|---|
| EP | WO95/16641 | 6/1995 |
| EP | 0527487 B1 | 11/1996 |
| EP | 0820964 A1 | 1/1998 |
| EP | WO99/02461 | 1/1999 |
| EP | WO99/02462 | 1/1999 |
| EP | 1023245 A | 4/1999 |
| EP | 0996598 B1 | 4/2001 |
| EP | 1132350 A1 | 9/2001 |
| EP | WO01/98221 A1 | 12/2001 |
| GB | 2162835 A | 2/1986 |
| GB | 2381269 A | 4/2003 |
| JP | 60-215546 | 10/1985 |
| JP | 61-136936 | 6/1986 |
| JP | 361219740 A | 9/1986 |
| JP | 408259256 A | 10/1996 |
| JP | 410101367 A | 4/1998 |
| WO | WO99/20577 | 4/1999 |

OTHER PUBLICATIONS

Journal of the Society of Glass Technology—XXIV. The Colour of Iron-Containing Glasses of Varying Composition, By Gordon F. Brewster and Norbert J. Kreidl (Bausch and Lomb Optical Co., Rochester, New York)—pp. 332-371 (pp. 372-373 missing) and continues from pp. 374-405, No date avaliable.

Journal of the Optical Society of America—vol. 38, No. 6, Jun. 1948 Entitled "Color Variations in Glasses Containing Iron" By John W. Forrest, Norbert J. Freidl and Tyler G. Pett, Bausch and Lomb Optical Company, Rochester 2, New York (Received Jan. 12, 1948)—pp. 554-560.

Coloured Glasses, By Woldemar A. Weyl, Published By the Society of Glass Technology, "Elmfield", Northumberland Road, Sheffield, IO 1951—Chapter VII, The Colours Produced By Iron: pp. 90-120; Chapter XVII, The Colours Produced by Sulphur and its Compounds, pp. 238-281. No Date Available.

* cited by examiner

INFRARED ABSORBING BLUE GLASS COMPOSITION

The invention relates to a blue soda-lime-silica glass composition that contains a colorant portion comprising iron oxide and cobalt oxide and further comprising manganese oxide to reduce amber color attributed to reaction of iron oxide with sulfate refining agents.

BACKGROUND OF THE INVENTION

It would be advantageous to improve infrared (IR) and ultraviolet (UV) absorption of soda-lime-silica glass products while maintaining a high visible transmission. For example, automotive vehicles require glass having high visible transmittance to assure optimum visibility for the operator. Infrared and ultraviolet light do not improve visibility, but generate heat within the passenger compartment and, particularly during summertime driving, increase the load on the air conditioning system to maintain comfort levels.

Iron oxide is commonly added to glass to produce a green color. In glass, iron oxide is found in two chemical forms. The oxidized compound is ferric oxide, $Fe_2O_3$, and is yellow. The reduced compound is ferrous oxide, FeO, and is blue. Advantageously, ferric oxide absorbs a portion of ultraviolet light passing through the glass product; and ferrous oxide absorbs a portion of infrared light passing through the glass product. Under typical furnace melting conditions, when the total iron oxide in the glass product is within the range of about 0.3 to 0.8 weight percent, the iron oxide equilibrium is such that the redox ratio of FeO to total iron oxide is about 0.23 to 0.26, which imparts a green color to the glass. As used herein, total iron oxide refers to weight of an equivalent amount of iron as ferrous oxide, $Fe_2O_3$. Also, as used herein, compositional percentages are based upon weight, except as otherwise noted.

During melting, it is common practice to add a sulfate compound, typically sodium sulfate, and a carbonaceous material, typically anthracite coal, for refining purposes. In the presence of carbon, the sulfate compound dissociates to form sulfur oxide that facilitates the removal of bubbles from the molten glass, which would otherwise produce defects in the product.

It is also desirable to produce glass having a dark blue coloration for aesthetic purposes. It is known that increasing the proportion of ferrous oxide relative to ferric oxide shifts the glass color from green to blue. This is readily accomplished by increasing the addition of carbonaceous material to the glass melt, whereupon the additional carbon reacts with ferric oxide to form additional ferrous oxide. However, decreasing the ferrous oxide reduces infrared absorption by the glass. Moreover, attempts to compensate by increasing the total iron concentration to maintain a high infrared absorption reduces visible transmittance of the glass and is not desired. This is attributed, in part, to a reaction between iron and sulfur derived from the sulfate refining agent to produce iron sulfide, which imparts an amber coloration that dramatically decreases visible transmittance and also shifts the color of the glass so that the desired aesthetically blue coloration is not achieved. It is also known to produce blue glass by additions of cobalt oxide. However, when added to glass containing iron sulfide, the amber coloration shifts the dominant wavelength away from the desired blue range and reduces visible transmittance.

Therefore, a need exists for a glass having enhanced blue coloration as indicated by a high excitation purity that is not diminished by iron sulfide amber or other non-blue coloration, and which further exhibits a high visible transmittance and high infrared absorption.

SUMMARY OF THE INVENTION

The present invention is a blue glass composition that comprises a soda-lime-silica base and a colorant portion consisting essentially of about 0.4 to 0.65 wt.% total iron oxide, reported as $Fe_2O_3$; about 0.1 to 0.3 weight percent manganese oxide reported as $MnO_2$; and cobalt oxide in an amount effective to produce a cobalt concentration of about 0.0002 to 0.0013 weight percent (about 2 to 13 ppm). The iron oxide includes significant concentrations of both ferric oxide and ferrous oxide, such that the ratio of FeO to total iron oxide is between about 0.43 and 0.58. As used herein, iron and manganese concentrations are reported based upon weights of equivalent amounts of $Fe_2O_3$ and MnO, respectively, whereas cobalt additions are reported based upon elemental weight.

Glass compositions according to this invention have the following spectral properties, measured at 4.0 mm thickness: about 68 to 76 percent Illuminant A transmittance (LTA); about 54 to 64 percent ultraviolet transmittance; about 12 to 22 percent infrared transmittance; about 38 to 47 percent total solar energy transmittance; a dominant wavelength between about 486 and 490 nanometers, preferably between 488 and 489 nanometers; and an excitation purity between about 7 and 11 percent.

Thus, glass composition in accordance to this invention exhibits an unexpected combination of high visible transmittance, high infrared absorption, and enhanced blue coloration. The enhanced blue coloration is demonstrated by the dominant wavelength in the blue spectrum and the relatively high excitation purity, and is attributed to the combination of ferrous oxide and cobalt oxide. The increased ferrous proportion, indicated by the relatively high redox ratio, also results in high infrared absorption. It is unexpectedly found that, despite the relatively high ferrous content, as well as the cobalt oxide presence, the manganese oxide addition is effective to reduce iron sulfide formation and thus avoid amber coloration. Still further, the cobalt oxide levels, with presence of ferrous oxide, are effective to enhance blue coloration, while being suitably low to avoid reducing visible transmittance. Thus, blue glass in accordance with this invention is particularly well suited for automotive or architectural use to provide an aesthetically pleasing appearance and high visible transmittance, while absorbing infrared radiation to reduce solar heating and thus the load on air conditioning systems required to cool compartments having windows formed of the glass.

DETAILED DESCRIPTION OF THE INVENTION

In accordance with a preferred embodiment of this invention, flat soda-lime-silica glass having an enhanced blue coloration is provided to use as automotive or architectural glazing. The blue glass comprises a soda-lime-silica base to which colorant is added and is conveniently made by the float glass process. A preferred base is composed of between about 68 to 75 weight percent $SiO_2$, 0 to about 5 weight percent $Al_2O_3$, about 5 to 15 weight percent CaO, 0 to about 10 weight percent MgO, about 10 to 18 weight percent $Na_2O$ and 0 to about 5 weight percent $K_2O$. The preferred base is further characterized by a total CaO and MgO between about 6 to 15 weight percent and a total $Na_2O$ and $K_2O$ between about 10 to 20 weight percent. Preferably $SO_3$ is between about 0.03 to 0.12 weight percent, more preferably between about 0.05 to 0.08 weight percent.

Blue glass in accordance with this invention also contains a colorant portion comprising iron oxide, manganese compound; and cobalt oxide.

Iron oxide is added in an amount effective to reduce ultraviolet and infrared transmittance. The total iron oxide, reported as $Fe_2O_3$, is preferably between about 0.4 to 0.65 weight percent. The iron oxide is conveniently added as ferric oxide and reacts with carbon or other reducing agents added to the melt during processing to form ferrous oxide. The proportion of ferrous oxide is characterized by the redox ratio, which the proportion by weight of FeO to total iron oxide, and is preferably between about 0.43 to 0.58.

It is found that the addition of manganese compound suppresses iron sulfide formation which would otherwise result from reaction between ferrous iron and sulfur derived from sulfate refining agents added to the glass melt during processing and produce undesirable amber coloration. Preferably, manganese is added in an amount between about 0.1 to 0.3 weight percent based on $MnO_2$. Manganese may be readily added in any suitable form, including $MnO_2$, $Mn_3O_4$, MnO, $MnCO_3$, $MnSO_4$, $MnF_2$, and $MnCl_2$.

The blue glass composition is preferably formed as a melt using a sulfate refining agent. Raising the redox ratio above the preferred range, particularly about 0.62, tends to result in formation of iron sulfide and the presence of the amber chromophore. In accordance with this invention, the blue glass composition contains cobalt oxide to enhance blue coloration without the undesired amber. Preferred cobalt content is between about 0.0002 and 0.0013 weight percent (2 and 13 ppm). More preferably, it is found that additions between about 0.0003 and 0.0010 weight percent (3 and 10 ppm) cobalt are effective to produce uniform and consistent coloration despite variation in the iron oxide content within the preferred ranges, while avoiding effects of cobalt on other glass properties.

The blue glass composition is preferably formed by a batch mixing process wherein raw materials are admixed and melted and the melt is feed to a conventional float glass furnace. By way of a preferred example, blue glass is made by admixing the raw materials in Table I within the recited ranges.

TABLE I

| RAW MATERIAL | WEIGHT IN POUNDS (LBS.) |
| --- | --- |
| SAND | 1000 |
| SODA ASH | 290 TO 350 |
| DOLOMITE | 215 TO 260 |
| LIMESTONE | 70 TO 90 |
| SALT CAKE | 2 TO 15 |
| ROUGE (97% $Fe_2O_3$) | 3.5 TO 11.5 |
| MANGANESE DIOXIDE | 0.65 TO 6.5 |
| COBALT OXIDE | 0.004 TO 0.025 |
| ANTHRACITE COAL | 1 TO 2.5 |
| NEPHELINE SYENITE | 0 TO 150 |

A preferred anthracite coal is commercially available from the Shamokin Filler Company under the trade designation Carbocite and comprises about 70 to 72 weight percent carbon. Alternately, graphite or other carbonaceous material may be suitably used as a source of reactive carbon. For graphite, a suitable addition is from 0.7 to 2.1 pounds of graphite per 1000 pounds of sand. Salt cake comprises sodium sulfate. In the presence of anthracite coal, the sulfate forms sulfur oxide that purges gasses from the melt that would otherwise form defects in the product. Additional coal in excess of the amount required for sulfate reaction is added to shift the iron oxide equilibrium to reduce the iron oxide derived form the rouge and form the desired ferrous oxide. Alternately, a coal slag commercially available from Calumite Corporation under the trade designation Melite, may be used instead of rouge in an amount up to about 55 pounds per 1000 pounds of sand. About 80% of the total iron oxide in Melite is ferrous oxide, thereby allowing the amount of the carbon addition to be reduced. Iron oxide may also be suitably added as cullet. Generally, increasing the quantity of sodium sulfate in the glass tends to shift the iron oxide equilibrium slightly toward oxidizing, whereas increasing carbon concentration in the glass batch shifts the iron oxide equilibrium toward reducing. Another influence on the iron oxide equilibrium is the peak furnace temperature. Increasing furnace temperature shifts the iron oxide equilibrium toward reduced ferrous oxide, whereas decreasing furnace temperature shifts toward the oxidized state.

Blue glass having enhanced blue coloration in accordance with this invention was made in laboratory melts in accordance with the following procedure. A base composition was formed of 100 grams sand, 32.22 grams soda ash, 8.81 grams limestone, 23.09 grams dolomite, 0.75 to 2.0 grams of sodium sulfate, 0.1 to 0.25 grams of carbocite, and 2.64 grams of nepheline syenite. To the base was added rouge, manganese dioxide, and cobalt oxide in amounts to achieve a desired colorant composition. The raw materials were dry mixed in a glass jar for 10 minutes using a Turbula mixer, and loaded into a platinum-rhodium crucible. A small amount of water was added to the dry mixture. The mixture was then melted in a gas-fired furnace for 1 hour at 2600° F. The melt was fritted, and the crucible plunged into cold water, whereupon the glass formed solid particles. The crucible was reheated to remelt the glass, and the fritting process was repeated. Thereafter, the glass was melted for 4 hours at 2600° F. The melt was poured into a graphite mold and cooled slowly. The solidified glass was annealed by heating quickly to 1050° F, holding for 2 hours, and then slowly cooling over a period of about 14 hours. Samples were ground and polished to about 4.0 mm thickness and tested to measure spectral properties. Results are reported in Table II, wherein % LTA is the percentage of transmittance using illuminant A and % LTC is the percentage transmittance using illuminant C, and % $Fe_2O_3$ is the weight percentage of total iron oxide.

TABLE II

| | Example 1 | Example 2 | Example 3 | Example 4 | Example 5 | Example 6 |
| --- | --- | --- | --- | --- | --- | --- |
| % LTA | 73.19 | 74.48 | 69.89 | 69.31 | 68.92 | 68.68 |
| % LTC | 75.68 | 76.92 | 72.77 | 72.17 | 71.83 | 71.53 |
| Dominant Wavelength | 487.8 | 488.2 | 488.6 | 488.1 | 488 | 487 |

TABLE II-continued

|  | Example 1 | Example 2 | Example 3 | Example 4 | Example 5 | Example 6 |
|---|---|---|---|---|---|---|
| % Excitation Purity | 8.5 | 8 | 9.8 | 10 | 10.3 | 10.5 |
| % UltraViolet Transmittance | 62.86 | 63.04 | 56.52 | 55.75 | 56.39 | 56.51 |
| % Infrared Transmittance | 20.58 | 21.11 | 13.21 | 14.2 | 13.64 | 15.61 |
| % Total Solar Energy | 45.42 | 46.2 | 39.52 | 39.93 | 39.49 | 40.71 |
| % $Fe_2O_3$ | 0.453 | 0.453 | 0.603 | 0.603 | 0.603 | 0.603 |
| % FeO | 0.236 | 0.24 | 0.318 | 0.305 | 0.312 | 0.288 |
| Redox Ratio | 0.521 | 0.530 | 0.527 | 0.506 | 0.517 | 0.478 |
| % $MnO_2$ | 0.15 | 0.15 | 0.15 | 0.15 | 0.15 | 0.15 |
| ppm Co | 4 | 6 | 3 | 6 | 7 | 13 |

Examples 7 through 12 were prepared in accordance with the aforementioned procedure and contained equal amounts of total iron oxide, and with varying amounts of cobalt oxide additions and varying redox ratios. The samples exhibited similar blue coloration despite the variations in cobalt oxide and redox ratio. As shown by the results, visible transmittance decreased as cobalt oxide content increased.

TABLE III

|  | Example 7 | Example 8 | Example 9 | Example 10 | Example 11 | Example 12 |
|---|---|---|---|---|---|---|
| % LTA | 73.79 | 72.74 | 73.63 | 72.13 | 72.03 | 71.19 |
| % LTC | 76.33 | 75.36 | 76.13 | 74.76 | 74.61 | 73.85 |
| Dominant Wavelength | 488.7 | 489 | 488.2 | 488.8 | 487.9 | 488.1 |
| % Excitation Purity | 8.2 | 8.4 | 8.3 | 8.6 | 8.9 | 9.1 |
| % UltraViolet Transmittance | 60.75 | 60.62 | 60.24 | 60.41 | 60.02 | 60.07 |
| % Infrared Transmittance | 18.15 | 17.02 | 19.78 | 16.7 | 18.48 | 17.06 |
| % Total Solar Energy | 44.14 | 42.94 | 45.02 | 42.55 | 43.68 | 42.46 |
| % $Fe_2O_3$ | 0.503 | 0.503 | 0.503 | 0.503 | 0.503 | 0.503 |
| % FeO | 0.262 | 0.273 | 0.247 | 0.276 | 0.258 | 0.272 |
| Redox Ratio | 0.521 | 0.543 | 0.491 | 0.549 | 0.513 | 0.541 |
| % $MnO_2$ | 0.15 | 0.15 | 0.15 | 0.15 | 0.15 | 0.15 |
| ppm Co | 2 | 2 | 4 | 4 | 6 | 6 |

Examples 13 through 18 were prepared by the aforementioned procedure, but with an increased total iron oxide content as compared to Examples 7 through 12. The results are reported in Table IV.

TABLE IV

|  | Example 13 | Example 14 | Example 15 | Example 16 | Example 17 | Example 18 |
|---|---|---|---|---|---|---|
| % LTA | 73 | 71.87 | 71.56 | 72.22 | 71.37 | 71.79 |
| % LTC | 75.39 | 74.44 | 74.1 | 74.91 | 73.98 | 74.44 |
| Dominant Wavelength | 489.3 | 488.6 | 488.5 | 488.4 | 488.1 | 487.9 |
| % Excitation Purity | 7.6 | 8.5 | 8.5 | 9 | 8.9 | 9.1 |
| % UltraViolet Transmittance | 56.14 | 57.4 | 56.74 | 58.41 | 57.03 | 57.81 |
| % Infrared Transmittance | 19.36 | 17.26 | 17.9 | 16.72 | 18.17 | 18.03 |
| % Total Solar Energy | 44.22 | 42.68 | 42.96 | 42.62 | 43.1 | 43.27 |
| % $Fe_2O_3$ | 0.553 | 0.553 | 0.553 | 0.553 | 0.553 | 0.553 |
| % FeO | 0.25 | 0.27 | 0.264 | 0.277 | 0.262 | 0.263 |
| Redox Ratio | 0.452 | 0.488 | 0.477 | 0.501 | 0.474 | 0.476 |
| % $MnO_2$ | 0.15 | 0.15 | 0.15 | 0.15 | 0.15 | 0.15 |
| ppm Co | 2 | 2 | 4 | 4 | 6 | 7 |

Therefore, this invention provides a blue glass that includes a soda-lime-silica base and also includes a colorant portion consisting of iron oxide, manganese oxide and cobalt oxide, and exhibits high infrared absorption and enhanced blue coloration.

While this invention has been described in terms of certain embodiments thereof, it is not intended to be so limited, but rather only to the extent set forth in the claims that follow.

We claim:

1. A blue glass composition for automotive glazing comprising a soda-lime-silica base and a colorant portion, said colorant portion, consisting essentially of:

0.4 to 0.65 weight percent total iron oxide in the form of $Fe_2O_3$, greater than about 0.1 to about 0.3 weight percent manganese oxide, cobalt oxide in an amount to produce a cobalt concentration of about 0.0002 to 0.0013 weight percent, wherein the redox ratio is between about 0.43 and 0.58, said blue glass composition being characterized by between about 68 to 76 percent illuminant A transmittance, about 54 to 64 percent ultraviolet transmittance, about 12 to 22 percent infrared transmittance, a dominant wavelength between about 486 and 490 nanometers, and a purity excitation between about 7 and 11 percent, as determined at 4.0 mm thickness.

2. The blue glass composition of claim 1 wherein the base comprises:
about 68 to 75 weight percent $SiO_2$,
about 10 to 18 weight percent $Na_2O$,
about 5 to 15 weight percent CaO,
0 to about 10 weight percent MgO,
0 to about 5 weight percent $Al_2O_3$; and
0 to about 5 weight percent $K_2O$.

3. The blue glass composition of claim 1 wherein the base is characterized by a total of $Na_2O$ and $K_2O$ between about 10 and 20 weight percent.

4. The blue glass composition of claim 1 wherein the dominant wavelength is between about 488 and 489 nanometers.

5. The blue glass composition of claim 1 wherein the total amount of iron oxide is between about 0.45 and 0.55 weight percent.

6. The blue glass composition of claim 1 wherein the manganese oxide is between about 0.14 and 0.2 weight percent.

7. The blue glass composition of claim 1 wherein the cobalt concentration due to cobalt oxide is between about 0.0003 and 0.0010 weight percent.

8. A blue glass composition for automotive or architectural glazing comprising a soda-lime-silica base and a colorant portion, said colorant portion consisting essentially of:

0.4 to 0.65 weight percent total iron oxide in the form of $Fe_2O_3$, greater than about 0.1 to about 0.3 weight percent manganese oxide, cobalt oxide in an amount to produce a cobalt concentration of about 0.0002 to 0.0013 weight percent, wherein the redox ratio is between about 0.43 and 0.58, said blue glass composition being characterized by between about 68 to 76 percent illuminant A transmittance, about 54 to 64 percent ultraviolet transmittance, about 12 to 22 percent infrared transmittance, a dominant wavelength between about 486 and 490 nanometers, and a purity excitation between about 7 and 11 percent, as determined at 4.0 mm thickness.

9. The blue glass composition of claim 1 wherein the blue glass contains between about 0.03 and 0.12 weight percent $SO_3$.

10. The blue glass composition of claim 1 wherein the blue glass contains between about 0.05 and 0.08 weight percent $SO_3$.

* * * * *